Jan. 19, 1926.
C. S. PICO
1,570,279
AIR BRAKE
Filed Nov. 6, 1924
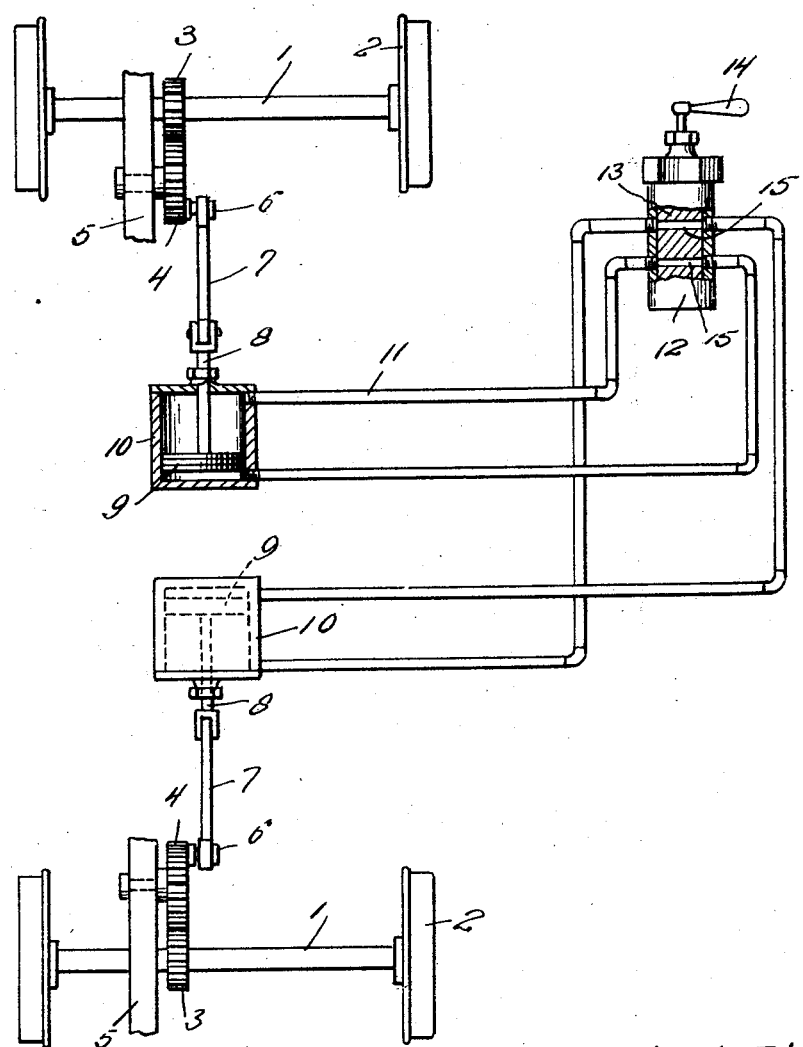
C. S. Pico,
Inventor
By Clarence A. O'Brien
Attorney Patented Jan. 19, 1926.

1,570,279

UNITED STATES PATENT OFFICE.

CARLOS SABATES PICÓ, OF SAN JUAN, PORTO RICO.

AIR BRAKE.

Application filed November 6, 1924. Serial No. 748,220.

*To all whom it may concern:*

Be it known that I, CARLOS S. PICÓ, a citizen of the United States, residing at San Juan, in the District of San Juan and Island of Porto Rico, have invented certain new and useful Improvements in Air Brakes, of which the following is a specification.

This invention relates to air brakes, and it consists in the novel features hereinafter described and claimed.

An object of the invention is to provide an air brake structure adapted to be efficiently used upon rolling stock and which is operatively connected with the wheel axles thereof, means being provided for applying the braking action to the wheels through the axles, and thus obviating the usual practice of applying the brake shoes directly to the wheels.

With the above objects in view, the structure includes gear wheels mounted upon the axles, and meshing with gear wheels, which are journalled upon the frame of the vehicle. Compression cylinders are carried by the vehicle and pistons are slidably mounted therein, and operatively connected with the last mentioned gear wheels. Pipes are connected with the opposite end portions of the cylinders, and a valve is connected in the said pipe, and may be manually manipulated to cut off or interrupt the passageway through the pipe, when it is desired to apply the brake.

In the accompanying drawing:

The figure is a plan view of the brake mechanism with parts thereof broken away and parts shown in section.

The axles of the vehicle are indicated at 1, and the said axles are supported upon wheels 2 in a usual manner. A gear wheel 3 is fixed to the intermediate portion of each axle, and meshes with a gear wheel 4 which is journalled to the frame 5 of the vehicle. The wheel 4 carries an eccentrically positioned pin 6, to which is pivotally connected one end of the pitman rod 7. The other end of the pitman rod 7 is pivotally connected with a piston rod 8, which carries a piston 9. The piston 9 is mounted for reciprocatory movement, in a cylinder 10, but the pin 6 is so positioned upon the wheel 4, that the length of the stroke of the piston 9 is not equal to the full length of the cylinder 10. Pipe sections 11 are connected with the cylinder 10 and communicate with the interior thereof, at points beyond the end of the stroke of the piston 9. A valve casing 12 is connected with the pipe section 11, and a valve 13 is turnably mounted in the casing 12. The valve 13 is provided with a handle 14, by using which the said valve may be manually turned in the casing. The valve 13 is provided with a passageway 15, which may be brought into register with the ends of the pipe sections 11, or which may be turned to a position to interrupt the passageway through the pipe sections 11. In the event that a plurality of cylinders is connected with the same valve casing 12, the valve 13 is provided with a plurality or a corresponding number of passageways 15. In the drawing, the valve casing 12 is shown as being connected with two sets of pipes 11, and two cylinders. Therefore, the valve 13 is provided with two passageways 15.

When the passageways 15 are in register with the ends of the pipe sections 11, the piston 9 may reciprocate freely in the cylinders 10, and are operated through the connections described and shown, from the axles 1, and as the said axles rotate. When the brake is to be applied, the valve 13 is turned by using the handle 14, so that the ends of the passageways 15 are moved out of register with the ends of the pipe sections 11, and consequently solid portions of the valve 13 are moved over the ends of the pipe sections 11, and the passageways through said pipe sections are interrupted and as the pistons 9 continue to reciprocate, the air is compressed alternately at opposite ends of the cylinder 10, and this compression serves as means for cushioning or braking the reciprocatory movement of the piston 9 and through the connecting means, this restraining influence upon the movement of the piston is transmitted to the axles 1, and the braking force is thus applied to the wheels 2.

Having described the invention, what is claimed is:

In combination, a wheel vehicle, wheel supported axles therefor, gear wheels mounted upon the axles, gear wheels journaled upon the vehicle and meshing with the first mentioned gear wheels and having eccentrically positioned wrist pins, cylinders on the vehicle having pistons slidably mounted therein, means operatively connecting the pistons with the wrist pins whereby the pistons reciprocate within the cylinders along paths which are shorter than the length of the cylinders, a pair of pipe sections connected with each cylinder and communicating with the interior thereof at points beyond the path of movement of the piston therein, a valve casing connected with the pairs of pipe sections, and a valve turnably mounted in the valve casing and having passageways adapted to be moved into registry with the pipe sections simultaneously.

In testimony whereof I affix my signature.

CARLOS SABATES PICÓ.